United States Patent
Arora et al.

(10) Patent No.: US 11,335,996 B2
(45) Date of Patent: *May 17, 2022

(54) MACHINE LEARNING MODELS FOR DETECTING THE CAUSES OF CONDITIONS OF A SATELLITE COMMUNICATION SYSTEM

(71) Applicant: Hughes Network Systems, LLC, Germantown, MD (US)

(72) Inventors: Amit Arora, Germantown, MD (US); Archana Gharpuray, Germantown, MD (US); John Kenyon, Germantown, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/155,359

(22) Filed: Jan. 22, 2021

(65) Prior Publication Data
US 2021/0143532 A1 May 13, 2021

Related U.S. Application Data

(63) Continuation of application No. 16/715,411, filed on Dec. 16, 2019, now Pat. No. 10,903,554, which is a (Continued)

(51) Int. Cl.
*H01Q 1/28* (2006.01)
*G01C 21/20* (2006.01)
(Continued)

(52) U.S. Cl.
CPC ............ *H01Q 1/288* (2013.01); *G01C 21/20* (2013.01); *G06K 9/46* (2013.01); *H01Q 1/28* (2013.01);
(Continued)

(58) Field of Classification Search
CPC .......... H01Q 1/288; G06K 9/46; G01C 21/20; H04B 7/18513
(Continued)

(56) References Cited

U.S. PATENT DOCUMENTS

| 4,334,226 A | * | 6/1982 | Eguchi | ...................... G01S 3/42 342/355 |
| 6,681,215 B2 | | 1/2004 | Jammu | |

(Continued)

FOREIGN PATENT DOCUMENTS

| CN | 102487293 | 6/2012 |
| CN | 104268381 | 3/2017 |

OTHER PUBLICATIONS

Barua et al., "A diagnostic tree approach for fault cause identification in attitude control subsystem of satellites," IEEE Transactions on Aerospace and Electronics Systems, Piscataway, NJ, Jul. 1, 2009, 45: 983-1002.

(Continued)

*Primary Examiner* — John J Lee
(74) *Attorney, Agent, or Firm* — Fish & Richardson P.C.

(57) ABSTRACT

Methods, systems, and apparatus, including computer programs encoded on a computer storage medium, for training and using machine learning models to detect problems in a satellite communication system. In some implementations, one or more feature vectors that respectively correspond to different times are obtained. The feature vector(s) are provided as input to one or more machine learning models trained to receive at least one feature vector that includes feature values representing properties of the satellite communication system and output an indication of potential causes of a condition of the satellite communication system based on the properties of the satellite communication system. A particular cause that is indicated as being a most likely cause of the condition of the satellite communication (Continued)

system is determined based on one or more machine learning model outputs received from each of the one or more machine learning models.

20 Claims, 5 Drawing Sheets

Related U.S. Application Data continuation of application No. 16/118,836, filed on Aug. 31, 2018, now Pat. No. 10,594,027.

(51) Int. Cl.
 *G06K 9/46* (2006.01)
 *H04B 7/185* (2006.01)

(52) U.S. Cl.
 CPC ..... *H04B 7/18513* (2013.01); *H04B 7/18515* (2013.01); *H04B 7/18519* (2013.01); *H04B 7/18584* (2013.01); *H04B 7/18597* (2013.01)

(58) Field of Classification Search
 USPC .................. 455/423, 67.11, 422.1, 12.1, 427
 See application file for complete search history.

(56) References Cited

U.S. PATENT DOCUMENTS

| | | | |
|---|---|---|---|
| 9,015,194 B2 | 4/2015 | Ziv et al. | |
| 9,122,602 B1 | 9/2015 | Jewell et al. | |
| 2015/0172096 A1 | 6/2015 | Sadovsky et al. | |
| 2016/0207458 A1* | 7/2016 | Pillai | H04N 5/225 |
| 2018/0004197 A1 | 1/2018 | Feenstra et al. | |
| 2018/0070527 A1* | 3/2018 | Richt | A01B 79/005 |
| 2019/0042885 A1* | 2/2019 | Han | G06N 5/04 |

OTHER PUBLICATIONS

Gao et al, "Fault detection and diagnosis for spacecraft using principal component analysis and support vector machines," Industrial Electronics and Application (ICIEA), 2012 $7^{th}$ IEEE Conference on Industrial Electronics and Applications, Jul. 18, 2012, pp. 1984-1988.

PCT International Search Report and Written Opinion in International Appln. No. PCT/US2019/048613, dated Nov. 15, 2019, 17 pages.

Yin et al., "Satellite fault diagnosis using support vector machines based on hybrid voting mechanism," The Scientific World Journal, Aug. 12, 2014, 2014:1-11.

PCT Preliminary Report on Patentability in International Appln. No. PCT/US2019/048613, dated Mar. 11, 2021, 10 pages.

\* cited by examiner

MACHINE LEARNING MODELS FOR DETECTING THE CAUSES OF CONDITIONS OF A SATELLITE COMMUNICATION SYSTEM

CROSS-REFERENCE TO RELATED APPLICATIONS

This application is a continuation of U.S. application Ser. No. 16/715,411, filed Dec. 16, 2019, now allowed, which is a continuation of U.S. application Ser. No. 16/118,836, filed Aug. 31, 2018, now U.S. Pat. No. 10,594,027. The entire content of the foregoing applications are incorporated herein by reference.

BACKGROUND

Satellite communication systems are complex systems that include multiple subsystems which, in turn, are made of multiple software and hardware components. The subsystems and components can also have multiple instances of software processes that implement the subsystems or components. For example, there may be multiple instances of Internet Protocol (IP) traffic handling subsystems to handle network traffic for a single satellite communication channel. Each subsystem, component, and software instance can have many pieces of status and statistical information that help define the state of the subsystem, component, of software instance.

SUMMARY

In some implementations, a communication system, e.g., a satellite communication system, can train and use machine learning models to predict causes of a condition of the satellite communication system. For example, a computer system can train machine learning models using data specifying properties of a satellite communication system at one or more points in time and, for each point in time, a label that indicates a cause (e.g., a primary cause or an initial or triggering cause) of a condition (e.g., a problem, degradation, or potential problem) of the satellite communication system at that time. The properties can include the status, statistics, metrics, and/or other appropriate data for each of multiple subsystems and components of the satellite communication system. The trained machine learning models can output machine learning outputs that indicate one or more potential causes of the condition of the satellite communication system based on properties of the satellite communication system.

The machine learning outputs can also indicate, for each potential cause, a probability that the potential cause is the actual cause of the condition of the satellite communication system. The computer system can use the probabilities output by multiple machine learning models for a given point in time or over a given time period to determine a most likely cause (e.g., a primary cause) of the condition of the satellite communication system. For example, the system can identify, as the most likely cause, a cause having the highest probability across the probabilities output by the machine learning models. In another example, the system can identify, as the most likely cause, a cause having a probability that has increased over time and that exceeds a threshold probability. In yet another example, the system can identify, as the most likely cause, a cause having a probability that has increased to exceed the probabilities of other potential causes.

The computer system can also select an action that alters the operation of the satellite communication system based on the identified most likely cause and/or the properties of the satellite communication system that were provided as input to the machine learning models. For example, if a slow storage device is slowing other components, preventing the other components from operating, and/or degrading the performance of the satellite communication system, the computer system can determine that the slow storage device is the most likely cause of the degraded performance (e.g., rather than the components affected by the slow storage device). The computer system can select switching to a different storage device as an action to take in response to the detected system conditions. The computer system can then provide, to a device, an indication of the most likely cause of the condition of the satellite communication system and/or the selected action. The device can present (e.g., using display or a spoken language interface) the most likely cause and/or the selected action to an operator. The operator can then cause a network management system (or the actual component or subsystem) to perform the selected action. In some implementations, the computer system can cause the selected action to be performed automatically, e.g., without input from the operator.

As satellite communication systems are complex and include many subsystems and components, determining a cause of a condition of the satellite system can be difficult and time consuming. For example, determining a primary cause of a current problem can involve triaging at multiple levels of the operations. For problems that do not get resolved using a well-known procedure of evaluating certain data and restarting certain subsystems, the triage escalates to higher tiers of the support hierarchy and by the time someone is able to perform a deep dive into the problem, a significant amount of time can pass and the problem can get worse and cause further degradation to the performance of the satellite communication system.

Using the machine learning techniques described herein, a computer system can determine the most likely cause of a condition of a satellite communication system that would otherwise not be detected. The machine learning models can detect and provide information indicating causes that are based on information (e.g., status and statistics information) for multiple subsystems or combinations of components that would not be evaluated by a human operator or expert.

The computer system can also adapt the machine learning models to changes in the satellite communication system, for example, by retraining the models using newly detected causes and their associated properties of the satellite communication system. This is advantageous over a rules-based system that a human operator or expert would have to adjust over time based on changes to the satellite communication system or changes in the performance of the satellite communication system. For example, a speed-based threshold for determining that a component is slower than normal may have to be adjusted each time the satellite communication system is altered such that the component operates at a higher speed. The machine learning models can be updated (e.g., retrained) to account for such changes over time. For example, the machine learning models can be retrained using updated data regarding the properties of the satellite communication system and the cause of the condition of the satellite communication system corresponding to those properties.

The machine learning models can also be used to determine the causes of conditions of other satellite communication networks, e.g., satellite communication systems that are similar to the satellite communication system for which the machine learning models are trained. This allows for the detection of causes of conditions of satellite communication systems for which a sufficient amount of data is not available, such as newly deployed satellite communication systems.

In one general aspect, the techniques disclosed herein describe methods of training and using machine learning models to determine a cause of a condition of a satellite communication system. For example, a method performed by one or more computers can include: obtaining, by the one or more computers, one or more feature vectors that respectively correspond to different times, each feature vector including feature values that represent properties of a satellite communication system at the time corresponding to the feature vector; providing, by the one or more computers, the one or more feature vectors as input to one or more machine learning models, each of the one or more machine learning models being trained to receive at least one feature vector that includes feature values representing properties of the satellite communication system and output an indication of potential causes of a condition of the satellite communication system based on the properties of the satellite communication system; receiving, by the one or more computers and from each of the one or more machine learning models, one or more machine learning model outputs that indicate one or more potential causes of a condition of the satellite communication system based on the properties of the satellite communication system represented by the one or more feature vectors; determining, by the one or more computers and based on the one or more machine learning model outputs received from each of the one or more machine learning models, a particular cause indicated as being a most likely cause of the condition of the satellite communication system; and providing, to a device, an indication of the particular cause of the condition of the satellite communication system.

Implementations can include one or more of the following features. For example, some implementations include selecting, by the one or more computers, an action to alter network operation of the satellite communication system based at least on the particular cause and causing the selected action to be performed.

Some implementations include training the one or more machine learning models using labeled training data for a particular satellite communication system. The labeled training data can include, for each of multiple times, properties of the particular satellite communication system at the time and labels that indicate one or more causes of a condition of the particular satellite communication system at the time. The one or more labels can be assigned to the properties of the particular satellite communication system by a network operator.

In some implementations, the one or more machine learning models include multiple machine learning models. Each machine learning model can be trained using different training parameters than each other machine learning model. The different training parameters can include at least one of (i) different types of machine learning models, (ii) different subsets of the labeled training data, or (iii) different configurations of a same type of machine learning model.

In some implementations, the one or more machine learning models include multiple machine learning models. The one or more machine learning model outputs can include, for each potential cause of the condition of the satellite communication system, a probability that the potential cause is an actual cause of the condition of the satellite communication system. Determining the particular cause indicated as being a most likely cause of the condition of the satellite communication system can include determining the particular cause based on one or more combined scores generated by determining, for each of the one or more potential causes, a combination of the probabilities output by the machine learning models for the potential cause.

In some implementations, the one or more machine learning models are trained to output an indication that the condition of the satellite communication system is normal based on the one or more feature vectors when the one or more machine learning models detect that the condition of the satellite communication is normal based on the properties of the satellite communication system.

In some implementations, the one or more feature vectors include multiple feature vectors for a particular time period. Each feature vector can include feature values that represent properties of the satellite communication system at a different time within the time period than each other feature vector. The one or more machine learning models can be trained to output an indication of potential causes of the condition of the satellite communication system based on the properties of the satellite communication system during the time period represented by the multiple feature vectors.

Some implementations include updating the one or more machine learning models. The updating can include receiving additional training data that includes a set of additional feature vectors and labels for the additional feature vectors, including a label, for each additional feature vector, that specifies a cause of a condition that of the satellite communication system at the time corresponding to the additional feature vector. Each additional feature vector can include feature values that represent actual properties of the satellite communication system detected at a time corresponding to the additional feature vector. The updating can also include training the one or more machine learning models using the additional training data.

Some implementations include using the one or more machine learning models to determine most likely causes of conditions of a second satellite communication system different from the satellite communication system based on properties of the second satellite communication system.

Some implementations include selecting, by the one or more computers, an action to alter network operation of the satellite communication system based at least on the machine learning model outputs and the particular cause. The selecting can include accessing a set of rules that specify, for each potential cause, one or more corresponding actions for altering the network operation of the satellite communication system and selecting, as the action to alter the network operation of the satellite communication system, at least one of the one or more actions that correspond to the particular cause.

Some implementations include selecting, by the one or more computers, an action to alter network operation of the satellite communication system based at least on the particular cause. The selecting can include providing data indicating the particular cause and the one or more feature vectors as input to one or more second machine learning models trained to receive a cause of a condition of the satellite communication system and at least one feature vector that includes feature values representing properties of the satellite communication system and outputs an indication of one or more actions to alter the network operation of the satellite communication system based on the cause and the at least one feature vector. The selecting can also include receiving, from each of the one or more second machine learning models, one or more second machine learning outputs that indicate one or more actions to alter the network operation of the satellite communication system based on the particular cause and the one or more feature vectors. The action to alter the network operation of the satellite communication system can be selected based at least on the one or more second machine learning outputs.

In some implementations, selecting the action to alter the network operation of the satellite communication system can include selecting the action based on data specifying results of each of the one or more actions indicated by the one or more second machine learning outputs when each of the one or more actions were previously performed in response to a previous instance of satellite communication system conditions associated with the particular cause.

In some implementations, the one or more second machine learning models are trained to output the indication of one or more actions to alter the network operation of the satellite communication system based on results of previous actions performed in response to previous conditions of the satellite communication system and associated causes of the previous conditions.

In some implementations, determining, by the one or more computers and based on the one or more machine learning model outputs received from each of the one or more machine learning models, a particular cause indicated as being a most likely cause of the condition of the satellite communication system can include identifying, for each of the one or more potential causes and based on the one or more machine learning outputs received from each of the one or more machine learning models for feature vectors that represent properties of the satellite communication system over a particular time period, a sequence of probabilities that the potential cause is an actual cause of the condition of the satellite communication system over the particular time period. The determining can also include selecting the particular cause based at on the sequence of probabilities for the particular cause and the sequence of probabilities for each other potential cause.

In some implementations, selecting the particular cause based at on the sequence of probabilities for the particular cause and the sequence of probabilities for each other potential cause can include selecting the particular cause in response to detecting an increase in the probabilities for the particular cause during the particular time period.

Some implementations include selecting, by the one or more computers, an action to alter network operation of the satellite communication system based at least on the particular cause and determining to perform the selected action automatically based on at least one of (i) a duration of time between providing the indication of the particular cause of the condition of the satellite communication system and receiving an operator command to perform the selected action exceeding a threshold duration, (ii) a category of the particular cause, (iii) a severity of the particular cause, or (iv) a severity of the condition of the satellite communication system. Some implementations can also include causing the selected action to be performed.

Some implementations include generating each of the one or more feature vectors. The generating for each particular feature vector can include identifying, for a component of the satellite communication system, properties of multiple sub-components of the component at the time corresponding to the particular feature vector; determining a property that represents the multiple sub-components based on the properties of the multiple sub-components; and including, in the particular feature vector and as a property of the component, the determined property.

Some implementations include generating each of the one or more feature vectors. The generating for each particular feature vector can include identifying, for a particular satellite beam, multiple components of a same type; identifying multiple properties of each of the multiple components; determining, for each property of the multiple properties, an aggregated value that represents an aggregation of the property across each of the multiple components; and including, in the particular feature vector and as a property of the satellite beam, the determined aggregated value.

Other embodiments include corresponding systems, apparatus, and software programs, configured to perform the actions of the methods, encoded on computer storage devices. For example, some embodiments include a satellite terminal and/or a satellite gateway configured to perform the actions of the methods. A device or system of devices can be so configured by virtue of software, firmware, hardware, or a combination of them installed so that in operation cause the system to perform the actions. One or more software programs can be so configured by virtue of having instructions that, when executed by data processing apparatus, cause the apparatus to perform the actions.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
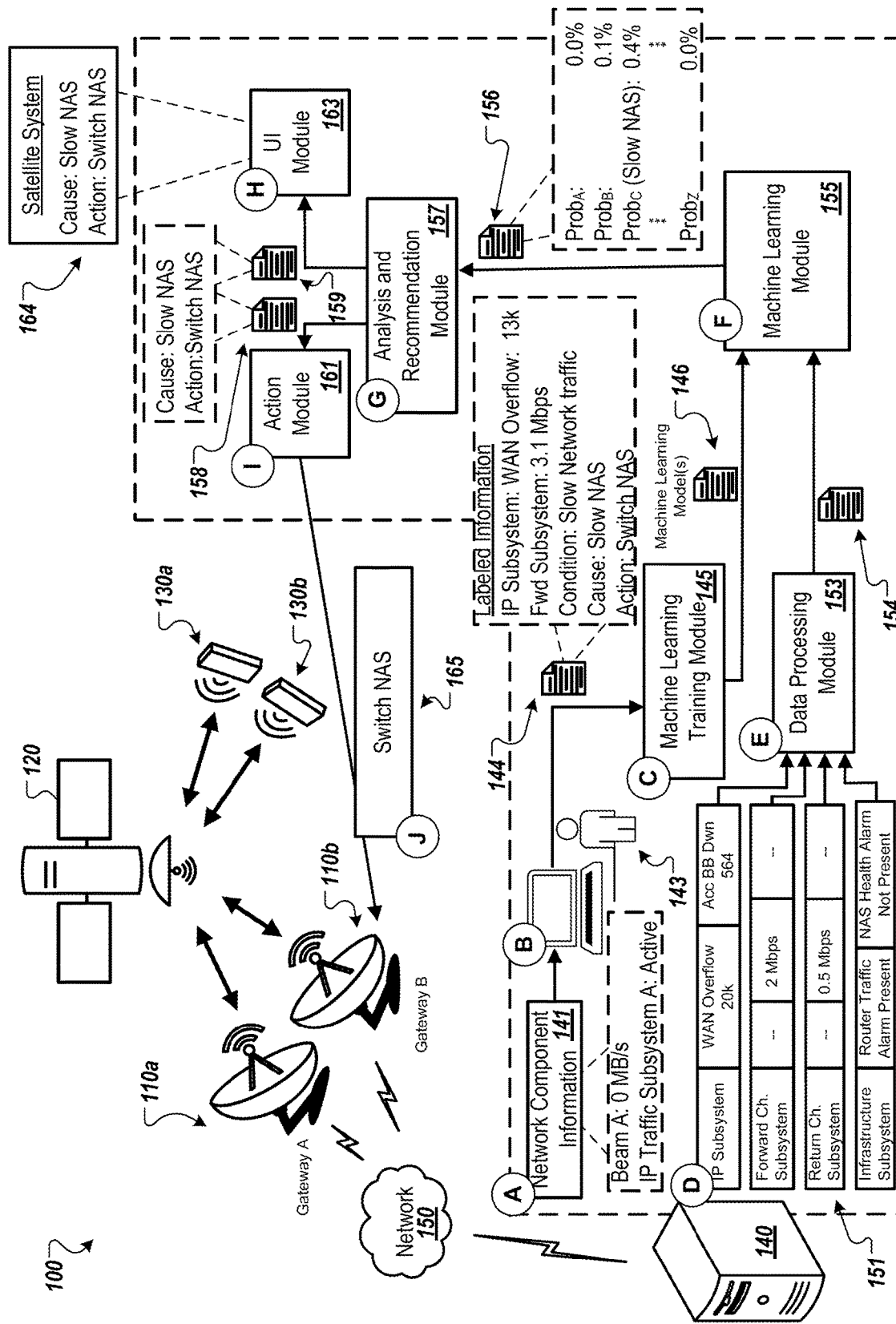
FIG. 1 is a diagram that illustrates an example of a system for using machine learning models to detect causes of conditions of a satellite communication system.

FIG. 1 is a diagram that illustrates an example of a system 100 for using machine learning models to detect causes of conditions of a satellite communication system. The system 100 includes satellite gateways 110a and 110b that communicate with a satellite 120, which in turn communicates with satellite terminals 130a and 130b. The system 110 also includes a computer system 140 that obtains information about the satellite communication system, for example, by communication with the satellite gateways 110a and 110b over a communication network 150. The elements shown can be part of a larger satellite communication network that includes several satellites, several satellite gateways, satellite terminals, and other elements not illustrated.

The satellite gateways 110a and 110b, the satellite 120, and the satellite terminals 130a and 130b can include subsystems that include multiple software and hardware components. In addition, the subsystems and their components can also have multiple instances of software processes that implement the subsystems or components. For example, a satellite gateway can include one or more IP traffic handling components, satellite forward channel handling component(s), and satellite return channel handling component(s), just to name a few of the components. The satellite gateway can also include multiple instances of the IP traffic component to handle traffic of each channel of each satellite beam.

The example of FIG. 1 illustrates how the computer system 140 can train and use machine learning models to evaluate the satellite communication system and detect one or more causes of a condition of the satellite communication system. The computer system 140 can also select an action to alter the operation of the satellite communication system based at least on the outputs of the machine learning models and cause the action to be performed. For example, the computer system 140 can train and use the machine learning models to detect a primary cause of a problem with the satellite communication system and select an action that will correct or prevent the problem from escalating. Various steps of the process are illustrated as stages labelled (A) through (J) which illustrate a flow of data.

In stage (A), the computer system 140 obtains network component information 141 that includes information about (e.g., properties of) the subsystems and components of the satellite communication system. The network component information 141 can include information about the various subsystems and components of the satellites, gateways, terminals, and other elements that make up the satellite network. The computer system 140 can obtain the network component information 141 from at least some of the elements. For example, the computer system 140 can obtain the network component information 141 from one or more of the satellite gateways 110a and 110b, which can obtain information from the satellite 120 and the satellite terminals 130a and 130b. In another example, the computer system 140 can obtain the network component information from a hub that obtains the information from one or more satellite gateways 110a and 110b.

The network component information 141 can include various information for each of the subsystems, components, and their respective software instances. The information for a component can include status data (e.g., active, inactive, error state, etc.), metrics and statistics (e.g., current data transmission speeds, peak data transmission speeds, the number of items in a queue, number of dropped packets, and so on), error and alarm data indicating whether any or particular errors or alarms are present and rates of errors and alarms, and/or other appropriate information about the status or operation of the component. The type of information and the amount of information can vary based on the component or type of component. For example, the information for an IP traffic handling subsystem can be different from the information for a data storage component, e.g., for a network-attached storage (NAS) device).

The computer system 140 can obtain the network component information 141 periodically based on a specified time period, e.g., one minute, five minutes, one hour, or another appropriate time period. For each point in time, the network component information 141 represents the overall state or health of the satellite communication system at that point in time.

In stage (B), the network component information 141 for each point in time (or for each time period) is assigned (or otherwise associated with) one or more labels. For example, a user 143 (e.g., a network operator or network expert) can label the network component information 141 for each point in time (or time period) with a label that indicates a cause of a condition of the satellite communication system at that point in time (or during that time period). If the same cause or condition is being experienced over a time period, the network component information 141 for each point in time can be assigned the same label.

In some implementations, the computer system 140 can provide an interface that includes controls that enable the user 143 to select, from a set of pre-specified labels, a label that represents the cause of the condition of the satellite communication system at that time. For example, the interface can present, as selectable controls, a set of labels that includes a normal label that indicates that the condition of the satellite communication system is normal and that there is no cause of any problems or other conditions in the satellite communication system. The set of labels can also include a label for each of a set of causes of conditions of (e.g., problems, potential problems, or issues with) the satellite communication network. For example, these labels can include labels for causes that have been detected by users in the past, labels for causes that are of interest to the users, labels for causes of conditions of other satellite communication systems that could occur in the satellite communication system, and/or other appropriate causes of conditions of satellite communication systems.

Some example labels include "slow access to NAS" when access to an NAS device is slow (e.g., less than a threshold speed), "ISP routing issue" when there is a problem or other issue with routing Internet data to or from an Internet Service Provider (ISP), and "uplink modulator issue" when there is a problem or other issue with the uplink modulator. The labels can describe conditions of components that can cause conditions of the overall satellite communication system. For example, when the NAS device is slow, this can prevent other components from accessing necessary data, resulting in queues overflowing, network traffic slowing down, and overall performance of at least one channel or beam being degraded. Thus, the labels can represent a primary cause (e.g., a root cause) of a condition (e.g., performance degradation, slow traffic, and so on) of the satellite communication system.

The computer system 140 can provide an interface that enables the user 143 to assign a label to the network component data 141 for a particular point in time based on an investigation into the cause of the condition of the satellite communication network. For example, after determining that a portion of the satellite communication system is experiencing a problem, the user 143 can review data logs, check the status of components, and/or perform other procedures to identify the cause of the problem. Once found, the user 143 can select, from the interface, a label that represents the cause, e.g., using an interface of the computing system 140. The computer system 140 can assign the selected label to the network component data 141 for the point in time or time period in which the condition occurred and the labelled cause was the cause of the condition. For example, the user 143 can select a label and select the time period during which the condition occurred. The computer system 140 can generate labelled network component information 144 by identifying network component information 141 for each point in time during the time period and assigning the selected label to the network component information 141 for each point in time during the time period. The computer system 140 can store the assigned label with respect to a particular data set that includes the network component information 141 that represents the properties of the satellite communication system at a particular point in time.

In some implementations, the computer system 140 can also include, in the labelled network component information 144, context data that indicates the condition of the satellite communication system and any actions performed to alter the operation of the satellite communication system. For example, the computer system 140 can store records that associate network conditions and causes with related actions performed in response (e.g., such as configuration changes to correct a problem), as well as effects that are subsequently observed or are attributed to the actions. The user 143 can perform or cause the components of the satellite communication system to perform one or more actions to correct a problem with the satellite communication system. The user 143 can provide, to the computer system 140, data specifying the actions. In some implementations, the computer system 140 can monitor the actions and effects of the actions automatically. For example, if the user 143 initiates the actions from an interface provided by the computer system 140 or a network management system in communication with the computer system 140, the computer system 140 can associate those actions and resulting effects with an ongoing network condition without the user specifying that the action attempts to resolve the condition. The labelled network component information 140 can also include, for each action, data specifying whether the action was successful, e.g., as indicted by the user 143 or as detected by the computer system 140 or the network management system. In the illustrated example, the labelled network component information 144 indicates some network properties (e.g., the IP traffic handling subsystem has an wide area network (WAN) overflow count of 13,000 and the forward channel subsystem has a data transmission speed of 3.1 Mbps), a condition of slow network traffic, a cause of a slow NAS device, and an action of switching the NAS device to a different NAS device.

In stage (C), a machine learning training module 145 of the computer system 140 uses the labelled network component information 144 for multiple points in time as training examples for training one or more machine learning models. In particular, the machine learning module 145 can train machine learning models using the labelled network component information 141 that has been collected and labelled over a given time period. In some implementations, the training examples used to train the machine learning models can include labelled network component information obtained from other satellite communication networks, e.g., in addition to the labelled network component information 141. The training examples used to trained the machine learning models can include a subset of the labelled network component information 144, e.g., selected by a user.

Each machine learning model can be any of various types, such as neural network, a maximum entropy classifier, a decision tree, an XG boost tree, a random forest classifier, a support vector machine, a logistic regression model, K-nearest neighbors, and so on. The training process alters the parameters of the machine learning model so that the model learns internal function(s) or mapping(s) between an input set of properties of a satellite communication system and potential causes of conditions of the satellite communication system (and respective probabilities for the potential causes). The properties of the satellite communication system can include information about the various subsystems and components of the satellites, gateways, terminals, and other elements that make up the satellite network, e.g., similar to or the same as the network component information 141. The probability for a potential cause represents a likelihood or confidence that the potential cause is the actual cause of the condition.

In some implementations, the labels used to train the machine learning model(s) includes only the causes of the conditions included in the labelled network component information 144. In some implementations, the labels used to train the machine learning model(s) also include the actions and whether the actions were successful as resolving the conditions.

Each machine learning model can be configured to receive properties of the satellite communication system (e.g., in the form of a feature vector) as input and output machine learning outputs that indicate one or more potential causes of the condition of the satellite communication system (e.g., one or more most likely causes). The machine learning outputs can also include, for each potential cause, a probability or confidence that the potential cause is the actual cause of the condition. In some implementations, each machine learning model is trained to receive multiple sets of properties of the satellite communication system (e.g., multiple feature vectors) obtained over a time period and output one or more causes of the condition of the satellite communication system during the time period and their respective probabilities. For example, the inputs can include multiple feature vectors and each feature vector can include feature values that represent the properties of the satellite communication system at a particular point in time during the time period. Each feature vector can be for a different point in time than each other feature vector provided as input. For example, the feature vectors can represent periodic states of the satellite communication system, e.g., a feature vector for each minute during the time period.

In some implementations, multiple machine learning models are trained and used to detect causes of conditions of the satellite communication system. In this example, each machine learning model can be different and the machine learning outputs of the machine learning models can be combined to determine a most likely cause of the condition of the satellite communication system, as described below. The machine learning models can be trained differently and/or be of different types (e.g., one or more neural networks and one or more random forest classifiers). The machine learning models can be trained differently by using different parameters (e.g., different tuning parameters, optimizers, or layers) and/or using different subsets of the labelled network component information. For example, the machine learning models 145 can include neural networks that have different numbers of layers and/or that have been trained using different subsets of the labelled data.

In some implementations, a respective machine learning model can be trained for each cause of conditions of the satellite communication system. In this example, the machine learning model for a particular cause can be trained using the feature vectors and, for each feature vector, a label indicating whether the particular cause is the actual cause of the condition. The machine learning model for the particular cause can be trained to output a probability that the particular cause is the actual cause of a condition of the satellite communication system based on properties of the satellite communication system.

Figure 4:
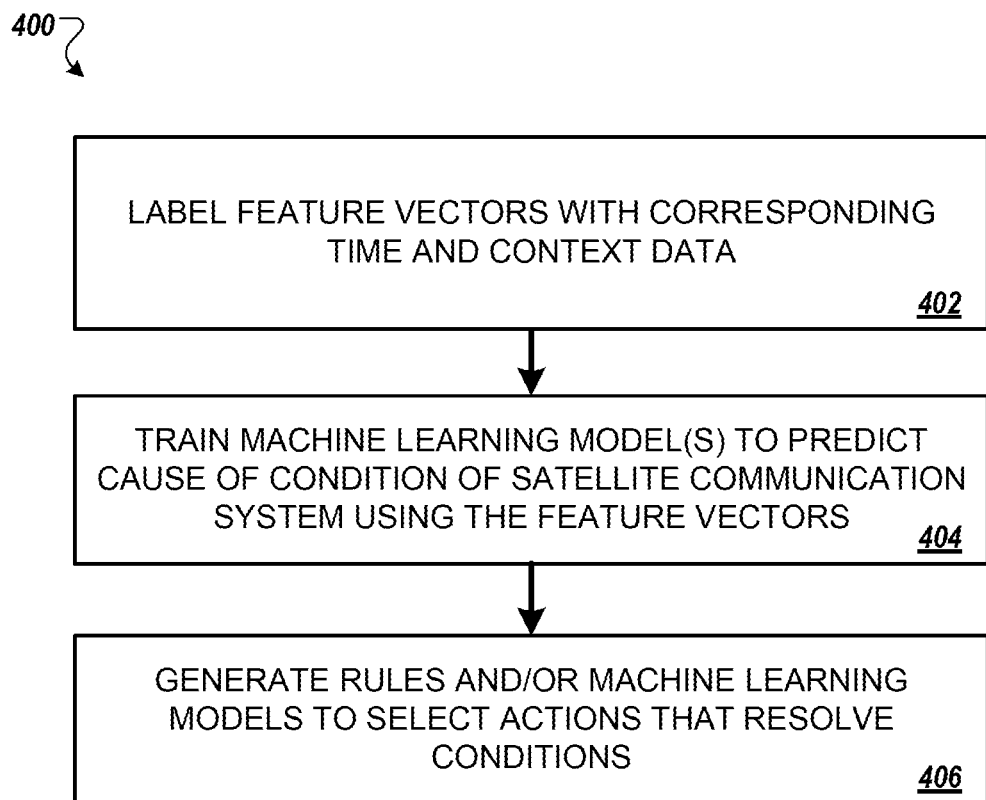
FIG. 4 is a flow diagram that illustrates an example process for training machine learning models to detect causes of conditions of a satellite communication system.

In some implementations, the machine learning training module 145 reduces the number of dimensions of each feature vector prior to using the feature vector to train the machine learning model(s). For example, the machine learning training module 145 can reduce the number of dimensions of each feature vector using a feedforward neural network, principal component analysis (PCA), another appropriate dimensionality reduction technique, and/or a combination of dimensionality reduction techniques. An example process for training a machine learning model to detect causes of conditions of a satellite communication system is illustrated in FIG. 4 and described below. After training the machine learning models, the machine learning training module 145 can provide machine learning model data 146 that includes the machine learning models to a machine learning module 155 that uses the models to determine a cause of a condition of the satellite communication system.

In stage (D), the computer system 140 obtains satellite system information 151 that indicates properties of the satellite communication network. As described above, the properties of the satellite communication system can include information about the various subsystems and components of the satellites, gateways, terminals, and other elements that make up the satellite network, e.g., similar to or the same as the network component information 141. The computer system 140 can obtain the satellite system information 151 from one or more elements of the satellite communication system, e.g., from one or more hubs (e.g., one or more gateways) of the satellite communication system. The computer system 140 can obtain the satellite system information 151 periodically based on a specified time period. Each set of properties for the satellite communication system can correspond to a particular point in time.

In this example, the satellite system information 151 includes data about an IP subsystem, a forward channel subsystem, a return channel subsystem, an infrastructure subsystem, and other components for which information is not presented in FIG. 1. The satellite system information 151 can include various data for each component. For example, the satellite system information 151 can include, for the IP traffic handling subsystem, a WAN queue overflow count that indicates a quantity of items added to the queue that exceeds the size of the queue and an acceleration backbone down count that indicates a number of times the acceleration backbone has went down over a time period. Similarly, the satellite system information 151 includes a data transmission speed for the forward channel subsystem, a data transmission speed for the return channel subsystem, and data indicating that a router traffic alarm of the infrastructure subsystem is present and that an NAS health alarm of the infrastructure subsystem is not present. Of course, the satellite system information 151 can include other data about the IP traffic handling subsystem, the forward channel subsystem, the return channel subsystem, and the infrastructure subsystem.

In stage (E), the data processing module 153 of the computer system 140 receives the satellite system information 151 and prepares the information 151 for input to the machine learning model(s). As the properties of the satellite communication system (e.g., the information about the components of the satellite communication system) includes different types of information (e.g., status, alarms, numerical data, and so on), the data processing module 153 can convert the information to an appropriate (e.g., common) format. For example, the data processing module 153 can convert any non-numerical data to numerical data that represents the non-numerical data. The data processing module 153 can convert each type of non-numerical data to numerical data using a conversion function. For example, information specifying whether an alarm is present can be converted to a zero if the alarm is not present or to a one if the alarm is present.

In some implementations, the data processing module 153 aggregates a portion of the satellite system information. The data processing module 153 can aggregate information based on component type, location in the satellite communication system, and/or the type of information. For example, if there are multiple instances of a same type of component (e.g., multiple instances of an IP traffic handling subsystem) for a same gateway or same beam, the data processing module 153 can aggregate (e.g., by averaging, convex summation, or another appropriate aggregation technique) the various data about the IP traffic handling subsystem across each instance. For each piece of information for the IP traffic handling subsystem, the data processing module 153 can aggregate that piece of information for the multiple instances. For example, if a piece of information is a data transmission speed, the data processing module 153 can determine the average data transmission speed for the instances of the IP traffic handling subsystem of the gateway or beam. This aggregated value can be a feature value for a feature of the beam or gateway.

The data processing module 153 can also normalize the satellite system information 151. For example, the data processing module 153 can normalize each piece of information such that the value of each piece of information has a value within a particular value range, e.g., between zero and one inclusive. Example techniques for converting, aggregating, and normalizing information are described below with reference to FIG. 3.

In stage (F), a machine learning module 155 obtains the processed satellite system information 154 and uses the trained machine learning model(s) and the processed satellite system information 154 to determine one or more potential causes of a condition of the satellite communication system. In some implementations, the machine learning module 155 generates a feature vector based on the processed satellite system information 154. The feature vector can include feature values that represent the properties of the satellite communication system. For example, the feature vector can include a feature value for each piece of information for each component (and/or for each aggregated value) included in the processed satellite system information 154. This feature vector is referred to herein as a feature vector for network health (FVNH) as the feature values included in the feature vector represents the overall status or health of the satellite communication system.

In some implementations, the machine learning module 155 pre-processes the FVNH prior to providing the FVNH as input to the machine learning model(s). The pre-processing can include reducing the dimensionality of the FVNH, e.g., using a feedforward neural network, principal component analysis (PCA), and/or another appropriate dimensionality reduction technique. By reducing the dimensionality of the FVNHs, the speed at which the machine learning models determine potential causes of a condition of the satellite communication system can be increased and the accuracy of the machine learning models can be increased by preventing overfitting.

The machine learning module 155 can provide the pre-processed FVNH (and optionally one or more other pre-processed FVNHs for the same time period) as input to each machine learning model. Each machine learning model can output machine learning outputs 156 based on the FVNH(s). The machine learning outputs 156 can indicate one or more potential causes of a condition of the satellite communication system and, for each potential cause, a probability that the potential cause is the actual cause of the condition. For example, each machine learning model can output a vector of probabilities that includes a probability for each potential cause in a set of potential causes. The set of potential causes can include each of the pre-specified labels that were used to label the training data used to train the machine learning model(s). The set of potential causes can also include a "normal" cause that indicates that the satellite communication is operating normally and does not have a cause of a problem. In this example, the probability of cause A is 0.0%, the probability of cause B is 0.1%, the probability of cause C (Slow NAS) is 0.4% and the probability of cause Z is 0.0%.

In some implementations, each machine learning model outputs one or more most likely causes based on the input FVNH(s). Each machine learning model can also output, for each of the one or more most likely causes, a respective probability that the most likely cause is the actual cause. In implementations in which the machine learning model(s) are trained using labels that indicate actions to alter the operation of the satellite communication system, each machine learning model can also output one or more actions based on the properties of the satellite communication system and/or the most likely cause(s) of the condition of the satellite communication system. Each machine learning model can also output, for each action, a probability that the action will alter the operation of the satellite communication system (e.g., a probability that the action will correct a problem in the satellite communication system).

In stage (G), an analysis and recommendation module 157 receives the machine learning outputs 156, determines a most likely cause of the network condition, and can select an action to alter operation of the satellite communication network based on the most likely cause. To determine the most likely cause, the analysis and recommendation module 157 can evaluate the probability of each potential cause. In this example, the analysis and recommendation module 157 can select, as the most likely cause, the cause having the highest probability. If multiple machine learning models are used, the analysis and recommendation module 157 can determine a combined score (e.g., a combined probability) for each potential cause based on the probability of that potential cause output by each machine learning model. For example, the combined score for a potential cause can be the average of the probabilities for the potential cause output by the machine learning models.

In some implementations, the analysis and recommendation module 157 can determine the most likely cause based on the probabilities for each potential cause over a time period. For example, the probabilities of a potential cause may change over time based on changes in the properties of the satellite communication network. In a particular example, if the statistics or metrics for components affected by a slow NAS device get worse over time, the probability of the cause of a degraded satellite system caused by a slow NAS can increase over time. If the probability of a particular cause remains the highest probability amongst the various potential causes for at least a threshold duration of time, the analysis and recommendation module 157 can determine that the particular cause is the most likely cause. In another example, if the probability of the particular cause increases at least a threshold amount over a period of time or increases to become the highest probability amongst the potential causes, the analysis and recommendation module 157 can determine that the particular cause is the most likely cause. In the illustrated example, the probability of the slow NAS has the highest probability and may be selected as the most likely cause.

The analysis and recommendation module 157 can use a set of rules and/or one or more machine learning models to select an action to alter the operation of the satellite communication system based at least on the determined most likely cause. The set of rules can specify an action based on one or more of the causes having the highest probabilities. For example, a rule may specify that, if the most likely cause is a slow NAS device, the action is to failover the NAS device to a backup NAS device. Another example rule may specify that, if the most likely cause is a slow NAS device and the next most likely cause is a communication module that communicates with the NAS device, the action is to reconfigure the communication module. The set of rules can be generated and maintained by a network operator, network expert, or another user.

The machine learning models for selecting the action can be trained to select an action based on the most likely cause and/or the FVNH(s) used to determine the potential causes and the probabilities of the potential causes. The machine learning models can be trained using labelled feature vectors that are labelled with actions that were performed to alter the operation of the satellite communication system (e.g., that corrected a problem with the satellite communication system). In some implementations, the feature vectors used to train the machine learning models include a vector of probabilities for the potential causes. In some implementations, the feature vectors include the same or similar data as the feature vectors used to train the machine learning models used by the machine learning module 153 to determine the probabilities of the potential causes.

The feature vectors can also be labelled with a level of effectiveness of the action. For example, if multiple actions were attempted to correct a problem, the label for the feature vectors that represent the properties of the satellite communication system while the problem was occurring can include each attempted action and a level of effectiveness of the action. In this way, the machine learning models can be trained to output an action based on how effective that action is predicted to be at altering the operation of the satellite communication system.

The analysis and recommendation module 157 can provide the appropriate feature vector(s) as input to the machine learning model(s) and receive machine learning outputs that indicate one or more actions. If machine learning model(s) were trained using probabilities of potential causes, the analysis and recommendation module 157 can provide, as the input, one or more vectors of probabilities output by the machine learning module 155. If the machine learning model(s) were trained using the feature vectors that represent the properties of the satellite communication system, the analysis and recommendation module 157 can provide, as the input, FVNH(s) used by the machine learning module 155 to determine the potential causes and their respective probabilities.

The analysis and recommendation module 157 can then provide data 158 identifying the action(s) and/or the most likely cause(s) to an action module 161. The analysis and recommendation module 157 can also provide data 159 identifying the action(s) and/or the most likely cause(s) to a user interface module 163.

In stage (H), the user interface module 163 can generate and provide a user interface, e.g., to a device of the user 143 or another user, that indicates the action(s) and/or the most likely cause(s). In some implementations, the device indicates the action(s) and the most likely cause(s) to the user 143 by way of e-mail, text message, and/or a spoken language interface.

The user interface module 163 can generate and update a dashboard interface that presents a current condition of the satellite communication system, one or more of the most likely causes of the condition, and/or actions that can be performed to resolve the condition, if appropriate. The user interface module 163 can also generate alarms when appropriate. For example, if at least a threshold number of sequential FVNHs are mapped to the same cause, the user interface module 163 can generate an alarm to alert a user (e.g., a network operator) to the cause.

In stage (I), the action module 161 determines whether to perform an action to alter the operation of the satellite communication network. In some implementations, the action module 161 prompts the user 143 to select from one or more recommended actions, e.g., the one or more actions selected by the analysis and recommendation module 157. If the user 143 selects an action, the action module 161 can cause a component of the satellite communication system to perform the action.

In some implementations, the action module 161 performs one or more actions automatically, e.g., without input from the user 143. For example, the action module 161 can cause a component of the satellite communication system to perform an action (e.g., a top rated action selected by the analysis and recommendation module 157). The action module 161 can then monitor the status and other information about the subsystems and components of the satellite communication system to determine whether the action was effective. If not, the action module 161 can cause another action to be performed, e.g., a next highest ranked action.

The action module 161 can determine to perform an action automatically based on the category or severity of the cause or condition. For example, the action module 161 can be configured (e.g., include a set of rules) to perform the action automatically if the cause is categorized in one of a set of pre-specified categories. In another example, the action module 161 can be configured to perform the action automatically after a duration of time passes (since the cause was first detected) and the user 143 has not selected an action or performed an action. This proactive action can prevent a problem with the satellite communication system from escalating.

In stage (J), the action module 161 provides data 165 to a component of the satellite system to initiate the action. In this example, the selected action is to switch the NAS device to another NAS device (e.g., as part of a failover) as the cause of the condition is a slow NAS device. In this example, the action module 161 can provide data 165 to a network management system that controls the NAS devices. The data can cause the network management system to switch the NAS device to another NAS device, e.g., a backup NAS device.

Figure 2:
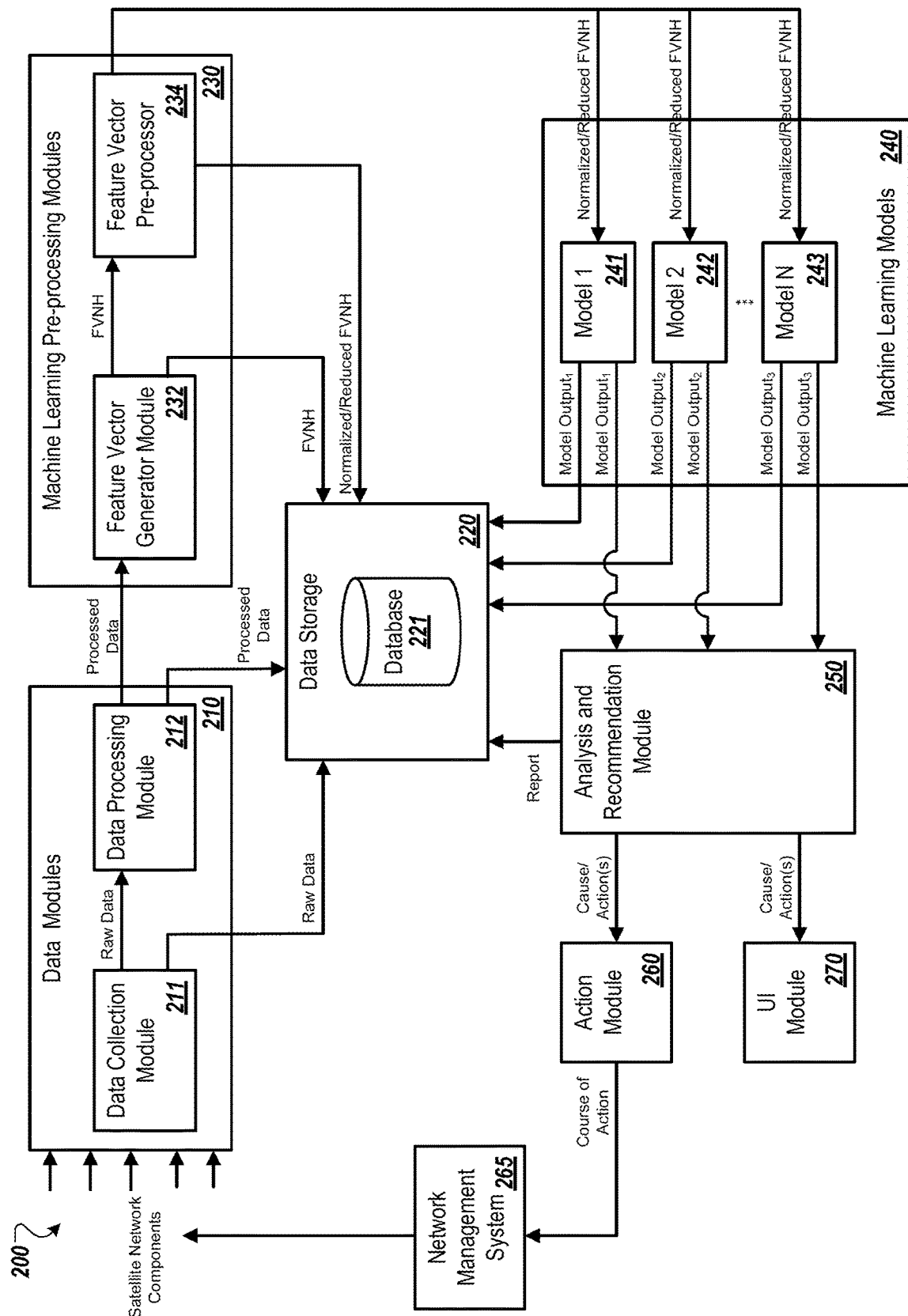
FIG. 2 is a diagram that illustrates an example of a system for using machine learning models to detect causes of conditions of a satellite communication system.

FIG. 2 is a diagram that illustrates an example of a system 200 for using machine learning models to detect causes of conditions of a satellite communication system and includes similar elements as the system 100 of FIG. 1. The system 200 can be implemented in one or more computing systems. The system 200 includes a data module 210 that includes a data collection module 211 and a data processing module 212. The data collection module 211 can obtain network component information (e.g., the network component information 141) from the subsystems and components of the satellite communication system. As described above, the network component information can include various information for each of the subsystems, components, and their respective software instances. The data collection module 211 can obtain the information periodically based on a specified time period, e.g., one minute, five minutes, one hour, or another appropriate time period.

The data collection module 211 can provide the raw data received from the component(s) of the satellite communication system to the data processing module 212 and to a data storage device 220 for storage in a database 221. The data storage device 220 can be implemented as a NAS device.

The data processing module 212 can prepare the raw data for input to machine learning models. This preparation can include converting the information to an appropriate format, aggregating the information, and/or normalizing the information. As described above, some information (e.g., status and alarm data) can be in the form of text. This text data can be converted to numerical data using a conversion function.

Figure 3:
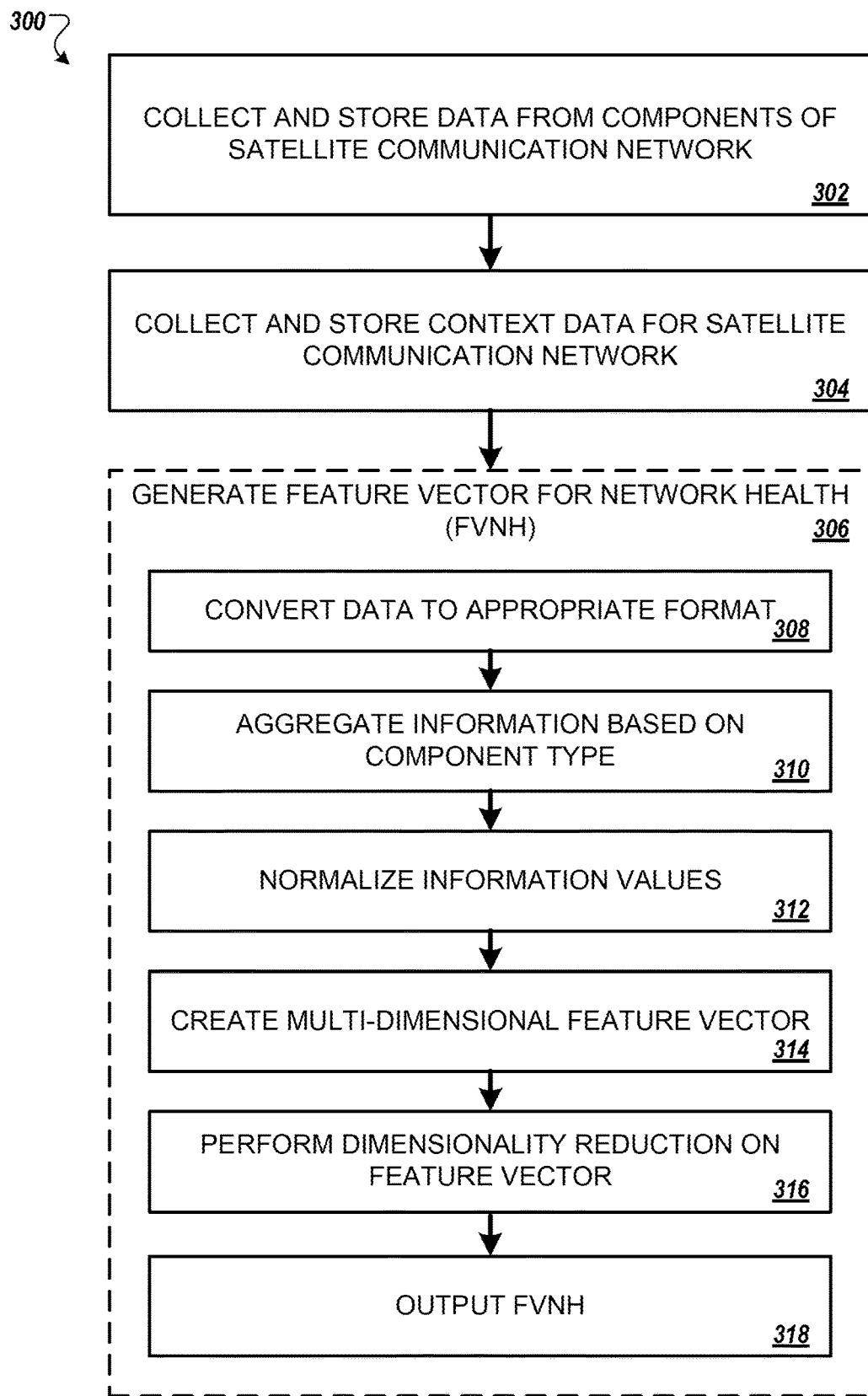
FIG. 3 is a flow diagram that illustrates an example process for generating a feature vector for network health.

The data processing module 212 can aggregate a portion of the information based on component type, location in the satellite communication system, and/or the type of information. For example, as described above, each piece of information for multiple instances of the same type of component and within the same part of the network (e.g., part of the same channel, beam, or gateway) can be aggregated using averaging, convex summation, of another appropriate aggregation technique. The data processing module 212 can also normalize the information and any aggregated information to a particular range, e.g., from zero to one inclusive. Example techniques for converting, aggregating, and normalizing data are illustrated in FIG. 3 and described below.

The data processing module 212 can provide the processed data to machine learning pre-processing modules 230 and to the data storage device 220. The machine learning pre-processing modules 230 include a feature vector generator module 232 and a feature vector pre-preprocessor 234. The feature vector generator module 232 can generate a feature vector (e.g., a FVNH) using the processed data received from the data processing module 212. The FVNH can be an n-dimensional vector that includes each processed value received from the data processing module. As described above, the FVNH represents the overall status or health of the satellite communication system at a particular point in time.

The feature vector generator module 232 provides the FVNH to the feature vector pre-processor 234 and to the data storage device 220 for storage in the database 221. Each FVNH can be stored in the database 221 with the time corresponding to the data included in the FVNH (e.g., the time at which the data was measured or obtained by the data collection module 211).

The feature vector pre-processor 234 can perform dimensionality reduction on the FVNH using one or more dimensionality reduction techniques. In some implementations, the feature vector pre-processor 234 reduces the dimensionality of the FVNH using a first dimensionality reduction technique, e.g., using a feedforward neural network. For example, an m-stage feedforward neural network can reduce the dimensionality of the FVNH from n dimensions to m dimensions (e.g., from more than 100 to between 5 to 10). The feature vector pre-processor 234 can also further reduce the dimensionality of the resulting reduced dimension FVNH using a second dimensionality reduction technique, e.g., PCA. For example, this can reduce the dimensionality from 5-10 dimensions to three dimensions to make it easier for a human to visualize the results.

The feature vector pre-processor 234 can provide the reduced dimension FVNH(s) to an ensemble of machine learning models 240 and to the data storage device 220 for storage in the database (e.g., with their corresponding times). As described above, each machine learning model 241-243 can be configured to receive, as input, one or more FVNHs and output one or more potential causes of a condition of the satellite communication system and, for each potential cause, a respective probability that the potential cause is an actual cause of the condition. Also, as described above, each machine learning model 241-243 can be trained or configured differently from each other machine learning model 241-243.

In some implementations, two versions of the FVNH are provided as input to each machine learning model. For example, the first version can be the reduced FVNH that was reduced using the first dimensionality reduction technique, e.g., to 5-10 dimensions. The second version can be the reduced FVNH that was reduced using the second dimensionality reduction technique, e.g. to three dimensions. In this example, the machine learning output of both versions of the FVNH can be combined for each machine learning model 241-243. For example, the probability for each potential cause can be averaged for each machine learning model 241-243 prior to the outputs of the machine learning models 241-243 are combined. In a particular example, the machine learning model 241 can output a probability for a slow NAS of 0.1% using the first version of the FVNH as the input. The machine learning model can also output a probability for the slow NAS of 0.3% using the second version of the FVNH as the input. In this example, the machine learning output of the machine learning model 241 for the slow NAS would be 0.2% (i.e., the average of 0.1% and 0.3%).

The machine learning outputs of the machine learning models 241-243 are provided to an analysis and recommendation module 250 and to the data storage device 220 for storage in the database 221. The analysis and recommendation module 250 can determine, from the machine learning outputs, a most likely cause of the condition of the satellite communication system and select an action to alter the operation of the satellite communication system. For example, as described above, the analysis and recommendation module 250 can determine the most likely cause by combining the machine learning outputs from multiple machine learning models 241-243 and select an action using a set of rules and/or one or more machine learning models.

The analysis and recommendation module 250 can provide data indicating the most likely cause and the selected action to an action module 260, a user interface module 270, and the data storage device 220 for storage in the database 221. As described above, the action module 260 can cause the selected action to be performed, e.g., automatically, based on the category of the cause, the severity of the condition, and/or based on a duration of time elapsing without user action. If the action module 260 can initiate the action by providing data (e.g., an instruction) to a network management system 265 that performs the action or causes a component of the satellite communication system to perform the action. The user interface module 270 can provide, to a device of a user, data indicating the most likely cause and the selected action, e.g., at a graphical user interface, by way of e-mail or text message, or using a spoken language interface.

FIG. 3 is a flow diagram that illustrates an example process 300 for generating an FVNH. The process 300 can be performed by the computer system 140 of FIG. 1 to generate an FVNH that can be input to one or more machine learning models and/or used to train one or more machine learning models. The process 300 can be performed on an ongoing or periodic basis to generate FVNHs that represent the status or health of the satellite communication system over time.

In step 302, the computer system 140 collects and stores data from components of a satellite communication system. The data can include information about (e.g., properties of) the subsystems and components of the satellite communication system. For example, as described above, the information can include status data, metrics, statistics, alarm data, error data, and/or other appropriate information about the components. The data can be collected periodically based on a specified time period. Each set of data can be stored with a time stamp that indicates a time at which the data was obtained.

In step 304, the computer system collects and stores context data for the satellite communication system. The context data for a FVNH can include a condition of the satellite communication system, a time period in which the condition occurred, a cause of the condition, one or more actions taken (or not taken) to alter the operation of the satellite communication system (e.g., to correct a problem or issue), categories of the causes, conditions, and/or actions, and/or appropriate context data. The context data can be obtained from a user (e.g., a network operator or network expert). For example, the computer system can prompt the user to provide the data, e.g., on a periodic basis. The context data for a particular point in time can be stored with (or with a reference to) the network component data collected for the particular point in time.

In step 306, the computer system 140 generates an FVNH using the collected data. The computer system 140 can generate the FVNH using constituent steps 308-318.

In step 308, the computer system 140 converts the data to an appropriate format. For example, the computer system 140 can convert any non-numerical data to numerical data. In a particular example, the computer system 140 can convert status data that can be one of a set of predefined statuses to a number that represents the status using a conversion function that maps each status to a corresponding numerical value.

In step 310, the computer system 140 aggregates information based on component type. For example, each component of a same type can have the same types of status, statistical, and other data. A subsystem can also include multiple instances of the same component. In these situations, the same data for multiple instances of the same component can be aggregated (e.g., by averaging or convex sum).

For example, let $C_i, i \in [1 \ldots n]$ represent the $i^{th}$ component or subsystem and $s_{ij}^{(t)}, j \in [1 \ldots m]$ represent the $j^{th}$ type of status or statistics of an instantiation of the $i^{th}$ component or subsystem at time t. The computer system 140 can aggregate the status or statistic $s_{ij}^{(t)}$ from individual software instantiations of the same type of component to derive $S_{ij}^{(t)}$ using a function f. For example, the computer system 140 can perform the aggregation using Relationship 1 below:

$$S_{ij}^{(t)} = f_i(s_{ij_1}^{(t)}, s_{ij_2}^{(t)}, s_{ij_3}^{(t)}, \ldots, s_{ij_n}^{(t)})$$   Relationship 1

In this example, $S_{ij}^{(t)}$ represents an aggregate of the status or statistic $s_{ij}^{(t)}$. The function f is an aggregation function, e.g., an average or a convex summation. For example, $S_{ij}^{(t)}$ can be an average data transmission speed for forward channel subsystems for a particular beam, gateway, or the entire satellite communication system. The FVNH can include each $S_{ij}^{(t)}$ for each statistic or status of each type of component in the satellite communication system. For example, the FVNH for time t can be represented by Relationship 2 below:

$$FVNH^t = [S_{11}^t, S_{12}^t, \ldots S_{1j}^t, S_{21}^t, S_{22}^t, \ldots S_{2j}^t, \ldots S_{i1}^t, S_{i2}^t, \ldots S_{ij}^t]$$ Relationship 2

In some implementations, the computer system 140 aggregates for multiple hierarchical levels within the system. For example, the computer system 140 can first aggregate at the service provider level by aggregating the same status and statistic data across each type of component for each service provider. Next, the computer system 140 can aggregate at the beam level by aggregating the same status and statistic data across all service providers for each individual beam. Next, the computer system 140 can aggregate at the gateway level by aggregating the same status and statistic data across each beam of each individual gateway. Finally, the computer system 140 aggregates for the satellite communication system by aggregating the same status and statistic data across all gateways of the satellite communication system.

In another example, the computer system 140 can aggregate data by identifying, for a component of the satellite communication system, properties of multiple sub-components of the component at the time corresponding to the feature vector. The computer system 140 can determine a property that represents the multiple sub-components based on the properties of the multiple sub-components (e.g., by averaging or otherwise combining the properties of the sub-components). The computer system 140 can include, in the feature vector, the determined property as a property of the component.

In another example, the computer system 140 can identify, for a particular satellite beam, multiple components of a same type (e.g., multiple forward channel subsystems). The computer system 140 can identify multiple properties of each of the multiple components. The computer system 140 can determine, for each property, an aggregated value that represents an aggregation (e.g., average) of the property across each of the multiple components. The computer system 140 can include, in the feature vector, the aggregated value as a property of the satellite beam.

In step 312, the computer system 140 normalizes the values of the data. For example, the computer system 140 can normalize each piece of data to be within a range of zero and one, inclusive, or another appropriate range. The computer system 140 can normalize the aggregated values as well as the non-aggregated values.

In step 314, the computer system 140 creates a multidimensional feature vector that includes, as feature values, each normalized value. The feature values represent the properties of the satellite communication system. The feature vector is also referred to herein as the FVNH as the feature values the status or health of the satellite communication system at a particular point in time.

In step 316, the computer system 140 performs dimensionality reduction on the FVNH. As described above, the computer system 140 can reduce the dimensionality of the FVNH using one or more dimensionality techniques, such as feedforward neural networks and/or PCA. For example, the computer system 140 can use an m-stage feedforward neural network to reduce the number of dimensions of the FVNH from "n" to "m," where "m" is less than "n" and "n" is the number of dimensions of the FVNH prior to dimensionality reduction. In some implementations, the computer system 140 can further reduce the dimensionality of the FVNH using PCA or another appropriate dimensionality reduction technique.

In operation, the accuracy of using, as input to the machine learning models, each reduced version can be monitored. If the accuracy using the reduced FVNH that was reduced to a dimensionality of "m" is greater than the accuracy of using the further reduced FVNH, then the reduced FVNHs may be used to detect the causes of conditions of the satellite communication system rather than the further reduced FVNHs.

In step 318, the reduced and/or further reduced FVNH are output. For example, the FVNH(s) can be provided to a machine learning training module for use in training machine learning models, as described below with reference to FIG. 3. The FVNH(s) can also be provided as input to one or more machine learning models, as described below with reference to FIG. 4.

FIG. 4 is a flow diagram that illustrates an example process 400 for training machine learning models to detect causes of conditions of a satellite communication system. The process 400 can be performed by the computer system 140 of FIG. 1.

In step 402, feature vectors are labeled with time and context data. The feature vectors can be the FVNHs (e.g., reduced FVNHs) generated using the process 300 of FIG. 3. The time for each feature vector can be the time at which the properties represented by the feature vectors were measured or detected. As described above, the context data for a FVNH can include a condition of the satellite communication system, a time period in which the condition occurred, a cause of the condition, one or more actions taken (or not taken) to alter the operation of the satellite communication system (e.g., to correct a problem or issue), categories of the causes, conditions, and/or actions, and/or appropriate context data. The computer system 140 can obtain the context data from a user (e.g., a network operator or network expert). For example, the computer system 140 can provide an interface that prompts the user to provide the data, e.g., on a periodic basis. The context data for a particular point in time can be stored with (or with a reference to) the feature vector for that particular point in time.

In some implementations, the computer system 140 converts each cause (and other context data) into numeric form so that the cause can be used in mathematical equations when training the machine learning model(s). The cause can be encoded using a technique referred to as "one hot encoding" which converts a single field (e.g., a cause of a condition) into multiple fields having binary values.

In step 404, the computer system 140 trains one or more machine learning models to detect (e.g., predict) the cause of a condition of a satellite communication system. The machine learning model(s) can be trained using the labelled training data (e.g., the labelled feature vectors). As described above, each of multiple machine learning models can be trained differently, e.g., using different training parameters. The different training parameters can include different types of machine learning models, different configurations (e.g., different tuning parameters, different optimizers, different numbers of layers, etc.) of a same type of machine learning model, different subsets of the labelled feature vectors, and/or other appropriate parameters. The machine learning model(s) can be configured to output one or more potential causes of the condition and, for each cause, a respective probability that the potential cause is the actual cause of the condition.

The machine learning models can also be configured to output a probability that the satellite communication system is operating normally. For example, the machine learning models can be trained to output an indication that the system is operating normally based on the feature vector(s) when the one or more machine learning models detect that the condition of the satellite communication is normal based on the properties of the satellite communication system.

In step 406, the computer system 140 generates rules and/or machine learning models to select actions that resolve conditions of the satellite communication system. As described above, a set of rules can specify an action based on one or more of the causes having the highest probabilities. The set of rules can be generated and maintained by a network operator, network expert, or another user. As described above, the machine learning models for selecting the action can be trained to select an action based on the most likely cause and/or the feature vectors used to determine the potential causes and the probabilities of the potential causes.

Figure 5:
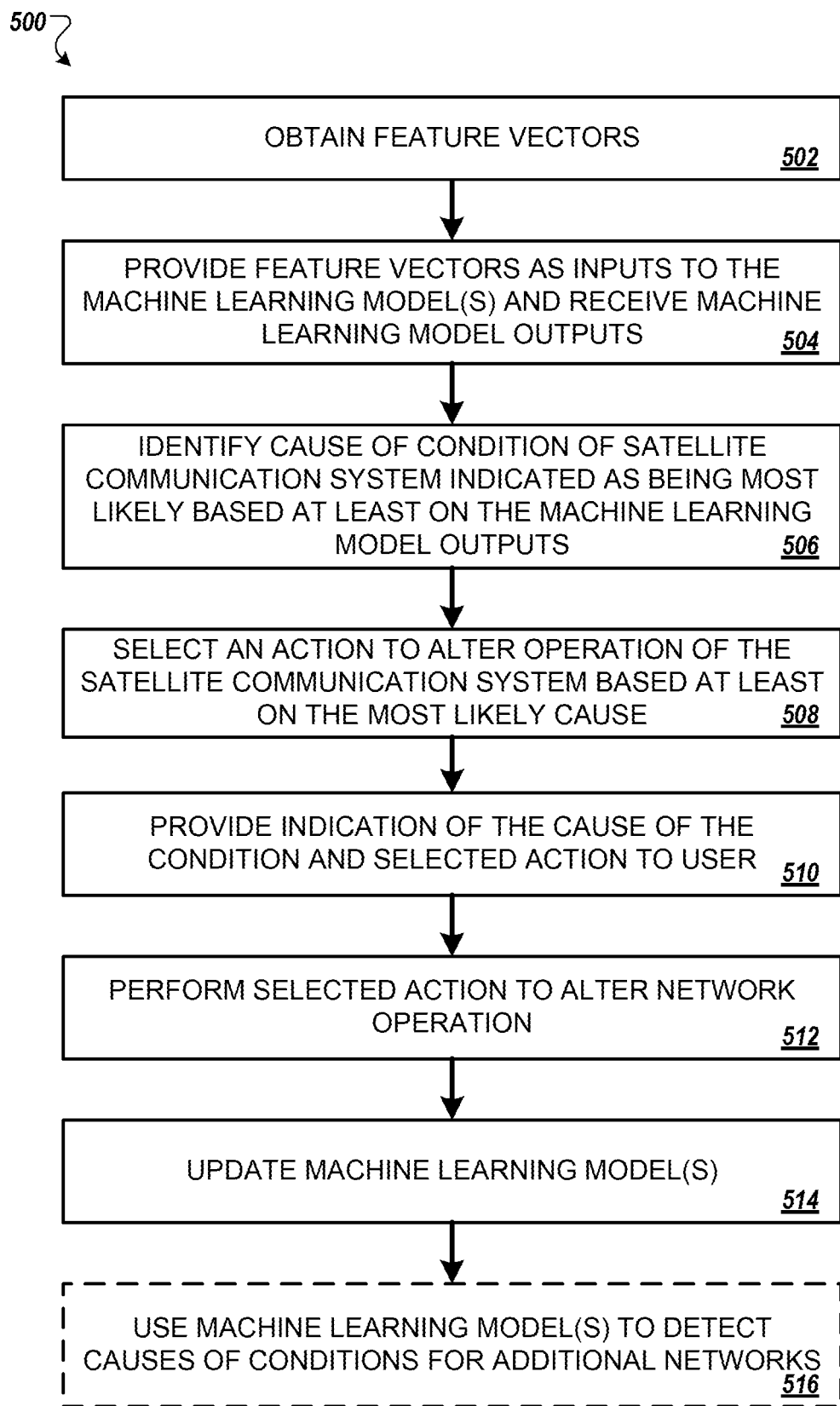
FIG. 5 is a flow diagram that illustrates an example process for using machine learning models to detect causes of conditions of a satellite communication system and performing a selected action to alter operation of the satellite communication system.

FIG. 5 is a flow diagram that illustrates an example process 500 for using machine learning models to detect causes of conditions of a satellite communication system and performing a selected action to alter operation of the satellite communication system. The process 500 can be performed by the computer system 140 of FIG. 1.

In step 502, the computer system 140 obtains feature vectors that represent the current status of the satellite communication system. The feature vectors can be FVNHs (e.g., reduced FVNHs output by the process 300) that include feature values that represent properties of a satellite communication system. The obtained FVNHs can represent the status or health of the satellite communication system and may be unlabeled, e.g., FVNHs for which the cause of the condition of the satellite communication system is not known. The obtained FVNHs can be for a recent time period, e.g., for a time period from a current time extending back to a start time.

In step 504, the computer system 140 provides at least one of the feature vectors as input to the machine learning model(s) and receives machine learning output(s) from each machine learning model. For example, each machine learning model can output one or more potential causes of the condition of the satellite communication system and, for each potential cause, a probability that the potential cause is the actual cause. The machine learning model(s) can determine the machine learning outputs based on the properties of the satellite communication system represented by the feature vector(s).

In step 506, the computer system 140 identifies the cause of the condition of the satellite communication system indicated as being most likely based at least on the machine learning outputs. For example, if multiple machine learning models are used, the computer system 140 can combine the outputs of the models. In a particular example, the computer system 140 can determine, for each potential cause, a combined score (e.g., a combination of the probabilities) for the potential cause across all of the machine learning models. For example, the combined score for a particular cause can be the average of the probability of that cause output by the machine learning models. The computer system 140 can then identify, as the most likely cause, the potential cause having the highest combined score (e.g., the highest average across the models). If a single machine learning model is used, the computer system 140 can identify, as the most likely cause, the potential cause having the highest probability output by the model.

As described above, the computer system 140 can identify the most likely cause based on machine learning outputs over a particular time period. In this example, the computer system 140 can identify, as the most likely cause, a potential cause that maintains the highest probability amongst the various potential causes for at least a threshold duration of time or a potential cause that has a probability that increases at least a threshold amount over a period of time or increases to become the highest probability amongst the potential causes. In a particular example, the computer system 140 can identify the most likely cause by identifying, for each potential cause and based on the machine learning outputs received over the particular time period, a sequence of probabilities that the potential cause is an actual cause of the condition of the system over the particular time period. The computer system 140 can select the particular cause based on the sequence of probabilities for each potential cause. For example, the computer system 140 can select a cause in response to the probabilities for the cause increasing over the sequence.

In another example, each machine learning model can be trained to output an indication of potential causes (and/or their probabilities) of the condition of the satellite communication system based on the properties of the satellite communication system during a particular time period represented by multiple feature vectors. In this example, the input to each machine learning model can be multiple feature vectors for the particular time period. Each feature vector can include feature values that represent properties of the satellite communication system at different times within the time period than each other feature vector. For example, one feature vector can be for a first point in time and a second feature vector can be for a second point in time different from the first point in time.

In step 508, the computer system 140 selects an action to alter the operation of the satellite communication system based at least on the most likely cause. For example, as described above, a set of rules or one or more machine learning models can be used to select an action based at least on the most likely cause. The computer system 140 can access a set of rules that specify, for each potential cause, one or more corresponding actions for altering the network operation of the satellite communication system. The computer system 140 can select, as the action to alter the network operation of the satellite communication system, at least one or more actions that correspond to the most likely cause.

The computer system 140 can also select the action based on other causes (e.g., the top n causes), the feature vectors used to detect the cause(s), data specifying whether actions were successful at resolving the condition in the past, and/or other appropriate data. For example, the computer system 140 can provide data indicating the most likely cause and the feature vector(s) as input to one or more machine learning models. The one or more machine learning models can be trained to receive a cause of a condition of the satellite communication system and at least one feature vector that includes feature values representing properties of the satellite communication system, and output an indication of one or more actions to alter the network operation of the system based on the cause and the feature vector(s).

The computer system 140 can receive, from each of the one or more machine learning models, one or more machine learning outputs that indicate one or more actions to alter the network operation of the system (e.g., and optionally a ranking of the actions) based on the cause and the feature vector(s). The computer system 140 can select the action to alter the network operation of the system based at least on the machine learning outputs. The computer system 140 can also select the action based on data specifying results of each of the one or more actions when each of the one or more actions were previously performed in response to a previous instance of conditions satellite communication system conditions associated with the particular cause. For example, the computer system 140 can select the action that has the highest success percentage indicating the percentage of time the action was successful at resolving the condition. In some implementations, the machine learning models are trained to output the indication of the one or more actions based on results of previous actions performed in response to previous conditions of the system and associated cause of the previous conditions.

In step 510, the computer system 140 provides an indication of the most likely cause and/or the selected action. For example, the computer system 140 can generate and provide a user interface that presents the most likely cause (and optionally other causes, such as the top n potential causes) and/or the selected action (and optionally other potential actions, such as the top n actions that could resolve the condition). In another example, the computer system 140 can provide the indication by way of e-mail, text message, or a spoken language interface.

In step 512, the selected action is performed. For example, the computer system 140 can prompt a user (e.g., network operator) whether to perform the selected action (or one of the other actions). In another example, the computer system 140 can initiate the selected action automatically, e.g., if the action or cause is categorized in a set of categories for which actions can be performed automatically or if a threshold duration of time has elapsed since the cause was detected.

The computer system 140 can determine to perform the selected action (e.g., without receiving a command from a network operator or other user to perform the selected action) based on a duration of time between providing the indication of the cause of the condition of the satellite communication system and receiving a user command to perform the selected action exceeding a threshold duration. In another example, the computer system 140 can determine to perform the selected action without receiving a command from a user to perform the selected action based on a category of the cause (e.g., the computer system 140 can perform actions for some categories of causes without user input while not performing the action for other categories). In another example, the computer system 140 can determine to perform the selected action without receiving a command from a user to perform the selected action based on a severity of the cause and/or a severity of the condition of the satellite communication system (e.g., of the cause or condition is has at least a threshold level of severity, the computer system 140 can perform the action automatically without user input).

After the selected action is performed, the computer system 140 can determine whether the selected action resolved the condition (e.g., corrected a problem with the system). For example, as described above, the computer system 140 can continuously process feature vectors to determine a cause of a condition of the satellite communication system. If the output(s) of the machine learning models change (e.g., from the cause for which the action was selected to normal), the computer system 140 can determine that the action resolved the condition. If the output(s) of the machine learning models remain the same (e.g., the most likely cause remains the same although the probabilities for each cause may vary) for at least a threshold duration of time, the computer system 140 can determine that the action did not resolve the condition.

In step 514, the computer system 140 updates the machine learning model(s). For example, if the condition is resolved, the computer system 140 can label the feature vectors used to detect the cause with the actual cause and other context data (e.g. the action that resolved the condition). The labelled feature vectors can then be used, with other labelled feature vectors (e.g., the ones previously used to train the models), to update the machine learning model(s). If the condition is not resolved, the computer system 140 can label the feature vectors used to detect the cause with data indicating that the selected action did not resolve the condition.

The computer system 140 can also receive additional training data that includes a set of additional feature vectors, e.g., labelled feature vectors that have been labelled with context data. Each additional feature vector can include feature values that represent properties of the satellite communication system detected at a time corresponding to the additional feature vector. The additional training data can also include labels for the additional feature vectors. The label for a feature vector can specify a cause of a condition of the satellite communication system at the time corresponding to the additional feature vector. The computer system 140 can train each machine learning model using the additional training data, e.g., in combination with the training data previously used to train the machine learning model(s).

In step 516, the computer system 140 (or another computer system) uses the machine learning model(s) to detect causes of conditions of other satellite communications systems. For example, the same machine learning mode(s) can be used to detect causes of conditions in similar satellite communication systems and satellite communication systems for which the amount of labelled data is not sufficient to train accurate models. The machine learning models can then be updated based on feature vectors used to detect causes of conditions of the other satellite communication systems and labels of causes determined to be the causes of the conditions.

The computer system 140 (or another computer system) can identify similar satellite communication systems using one or more criteria. The criteria can include types an arrangements of components in the systems, spectrum size, data traffic (e.g., application level traffic), geographic location, and/or other appropriate criteria. For example, if two satellite communication systems have similar sized (e.g., within a threshold spectrum amount) forward and/or return links, the computer system 140 can determine that the two systems are similar.

In another example, if at least a portion of the application level traffic (e.g., at least 50% of the application level traffic) is of a same type, the computer system 140 can determine that the two systems are similar. In a particular example, two systems that are primarily used by small offices and home users may have a common type of application level traffic and two systems that are primarily used for enterprise applications may have a common type of application level traffic. In this example, the computer system 140 can determine that the two systems primarily used by small offices and home users are similar. Similarly, the computing system 140 can determine that the two systems primarily used for enterprise applications are similar.

In yet another example, satellite communication systems in the same geographic region (e.g., same country, continent, state, etc.) may have similar architecture or traffic patterns.

In this example, the computer system can determine that the systems are similar if they are located in the same geographic region.

Embodiments of the invention and all of the functional operations described in this specification may be implemented in digital electronic circuitry, or in computer software, firmware, or hardware, including the structures disclosed in this specification and their structural equivalents, or in combinations of one or more of them. Embodiments of the invention may be implemented, in part, as one or more computer program products, i.e., one or more modules of computer program instructions encoded on a computer-readable medium for execution by, or to control the operation of, data processing apparatus. The computer readable medium may be a non-transitory computer readable storage medium, a machine-readable storage device, a machine-readable storage substrate, a memory device, a composition of matter effecting a machine-readable propagated signal, or a combination of one or more of them. The term "data processing apparatus" encompasses all apparatuses, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) may be written in any form of programming language, including compiled or interpreted languages, and it may be deployed in any form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

While this specification contains many specifics, these should not be construed as limitations on the scope of the invention or of what may be claimed, but rather as descriptions of features specific to particular embodiments of the invention. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

Thus, particular embodiments of the invention have been described. Other embodiments are within the scope of the following claims. For example, the actions recited in the claims may be performed in a different order and still achieve desirable results.

What is claimed is:

1. A method performed by one or more processors, the method comprising:
   receiving, by the one or more processors, one or more sets of feature values that indicate at least one of (i) properties of a communication system or (ii) an indication of a predicted cause of a condition of the communication system;
   providing, by the one or more processors, the one or more sets of feature values as input to one or more machine learning models configured to generate, based on input feature values, scores for one or more candidate actions that alter operation of the communication system;
   receiving, by the one or more processors, a score for each of the one or more candidate actions that alter the operation of the communication system, wherein each score was generated using the one or more machine learning models based on the one or more sets of feature values;
   selecting, by the one or more processors, at least one of the one or more candidate actions that alter the operation of the communication system based on the score for each candidate action of the one or more candidate actions; and
   providing, by the one or more processors and to a device, an indication of the at least one candidate action that alters the operation of the communication system that was selected based on the score for each candidate action of the one or more candidate actions.

2. The method of claim 1, wherein each of the one or more machine learning models has been trained based on examples of (i) sets of feature vectors for communication systems experiencing an undesired condition and (ii) corresponding actions to remove the undesired condition.

3. The method of claim 1, further comprising performing the at least one candidate action that alters the operation of the communication system that was selected based on the score for each candidate action of the one or more candidates.

4. The method of claim 3, wherein performing the at least one candidate action comprises:
   performing a first candidate action having a highest score among the one or more candidate actions;
   determining that the first candidate action was not successful in altering the operation of the communication system; and in response to determining that the first candidate action was not successful in altering the operation of the communication system, performing one or more additional candidate actions of the one or more candidate actions.

5. The method of claim 1, wherein the one or more sets of feature vectors comprise, for each potential cause of one or more potential causes of the condition of the communication system, a probability that the potential cause is an actual cause of the condition of the communication system.

6. The method of claim 1, wherein each probability is output by another machine learning model configured to output an indication of potential causes of potential conditions of the communication system based on the properties of the communication system.

7. The method of claim 1, wherein the one or more sets of feature values indicate one or more previous actions performed to alter the operation of the communication system and, for each previous action, an indication of an effectiveness of the previous action in altering the operation of the communication system.

8. The method of claim 7, wherein each of the one or more previous actions were performed to resolve a corresponding condition of the communication system and the indication of the effectiveness of each previous action is an indication of the effectiveness of the previous action in resolving the corresponding condition.

9. The method of claim 1, wherein the score for each of the one or more candidate actions that alter operation of the communication system represents a probability that the candidate action will alter the operation of the communication system.

10. A system, comprising:
one or more processors; and
one or more non-transitory computer-readable media storing instructions that, when executed by the one or more processors, cause the one or more processors to perform operations comprising:
receiving one or more sets of feature values that indicate at least one of (i) properties of a communication system or (ii) an indication of a predicted cause of a condition of the communication system;
providing the one or more sets of feature values as input to one or more machine learning models configured to generate, based on input feature values, scores for one or more candidate actions that alter operation of the communication system;
receiving a score for each of the one or more candidate actions that alter the operation of the communication system, wherein each score was generated using the one or more machine learning models based on the one or more sets of feature values;
selecting at least one of the one or more candidate actions that alter the operation of the communication system based on the score for each candidate action of the one or more candidate actions; and
providing, to a device, an indication of the at least one candidate action that alters the operation of the communication system that was selected based on the score for each candidate action of the one or more candidate actions.

11. The system of claim 10, wherein each of the one or more machine learning models has been trained based on examples of (i) sets of feature vectors for communication systems experiencing an undesired condition and (ii) corresponding actions to remove the undesired condition.

12. The system of claim 10, wherein the operations comprise performing the at least one candidate action that alters the operation of the communication system that was selected based on the score for each candidate action of the one or more candidate actions.

13. The system of claim 12, wherein performing the at least one candidate action comprises:
performing a first candidate action having a highest score among the one or more candidate actions;
determining that the first candidate action was not successful in altering the operation of the communication system; and
in response to determining that the first candidate action was not successful in altering the operation of the communication system, performing one or more additional candidate actions of the one or more candidate actions.

14. The system of claim 10, wherein the one or more sets of feature vectors comprise, for each potential cause of one or more potential causes of the condition of the communication system, a probability that the potential cause is an actual cause of the condition of the communication system.

15. The system of claim 10, wherein each probability is output by another machine learning model configured to output an indication of potential causes of potential conditions of the communication system based on the properties of the communication system.

16. The system of claim 10, wherein the one or more sets of feature values indicate one or more previous actions performed to alter the operation of the communication system and, for each previous action, an indication of an effectiveness of the previous action in altering the operation of the communication system.

17. The system of claim 16, wherein each of the one or more previous actions were performed to resolve a corresponding condition of the communication system and the indication of the effectiveness of each previous action is an indication of the effectiveness of the previous action in resolving the corresponding condition.

18. The system of claim 10, wherein the score for each of the one or more candidate actions that alter operation of the communication system represents a probability that the candidate action will alter the operation of the communication system.

19. One or more non-transitory computer-readable media storing instructions that, when executed by one or more processors, cause the one or more processors to perform operations comprising:
receiving one or more sets of feature values that indicate at least one of (i) properties of a communication system or (ii) an indication of a predicted cause of a condition of the communication system;
providing the one or more sets of feature values as input to one or more machine learning models configured to generate, based on input feature values, scores for one or more candidate actions that alter operation of the communication system;
receiving a score for each of the one or more candidate actions that alter the operation of the communication system, wherein each score was generated using the one or more machine learning models based on the one or more sets of feature values;
selecting at least one of the one or more candidate actions that alter the operation of the communication system based on the score for each candidate action of the one or more candidate actions; and providing, to a device, an indication of the at least one candidate action that alters the operation of the communication system that was selected based on the score for each candidate action of the one or more candidate actions.

20. The one or more non-transitory computer-readable media of claim 19, wherein each of the one or more machine learning models has been trained based on examples of (i) sets of feature vectors for communication systems experiencing an undesired condition and (ii) corresponding actions to remove the undesired condition.

* * * * *